United States Patent [19]

Sutherlin

[11] Patent Number: 5,180,796
[45] Date of Patent: Jan. 19, 1993

[54] DERIVATIZATION OF ARYLENE SULFIDE POLYMERS

[75] Inventor: Dirk M. Sutherlin, Bartlesville, Okla.

[73] Assignee: Phillips Petroleum Company, Bartlesville, Okla.

[21] Appl. No.: 485,008

[22] Filed: Feb. 26, 1990

[51] Int. Cl.⁵ .............................................. C08G 79/04
[52] U.S. Cl. .................................. 525/537; 528/373; 528/391
[58] Field of Search ......................... 525/537; 528/388

[56] References Cited

U.S. PATENT DOCUMENTS

| | | | |
|---|---|---|---|
| 3,354,129 | 11/1967 | Edmonds, Jr. et al. | 268/79 |
| 4,247,682 | 1/1981 | Dahl | 528/175 |
| 4,301,274 | 11/1981 | Campbell | 528/388 |
| 4,497,924 | 2/1985 | Robeson et al. | 524/151 |
| 4,544,705 | 10/1985 | Maresca | 525/132 |
| 4,593,086 | 6/1986 | Jansons et al. | 528/173 |
| 4,608,433 | 8/1986 | Meyer et al. | 528/388 |
| 4,611,033 | 9/1986 | Maresca | 525/419 |
| 4,680,381 | 7/1987 | Asada | 528/501 |

Primary Examiner—John C. Bleutge
Assistant Examiner—Helen F. Lee
Attorney, Agent, or Firm—Beverly M. Dollar

[57] ABSTRACT

An arylene sulfide polymer having derivatized endgroups and a process for preparing derivatized arylene sulfide polymer comprising contacting at an elevated temperature, an arylene sulfide polymer, a compound having the formula

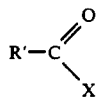

wherein R' is selected from the group consisting of an alkyl radical having 1 to about 17 carbon atoms, an aryl radical having 6 to about 16 carbon atoms, and combinations thereof and X is selected from the group consisting of chlorine and bromine, and a solvent which is stable in the presence of the compound and is capable of dissolving the arylene sulfide polymer.

13 Claims, 5 Drawing Sheets

DERIVATIZATION OF ARYLENE SULFIDE POLYMERS

BACKGROUND OF THE INVENTION

This invention relates to arylene sulfide polymers having derivatized end-groups. In one aspect, this invention relates to poly(phenylene sulfide) having derivatized end-groups. In another aspect, this invention relates to the preparation of arylene sulfide polymers having derivatized end-groups. In a further aspect, this invention relates to the preparation of poly(phenylene sulfide) having derivatized end-groups.

Control of functionality of end-groups of arylene sulfide polymers is typically done by end-capping. In general, end-capping is accomplished by addition of an end-capping agent to the polymerization mixture at or near the end of the polymerization cycle and prior to the polymer recovery steps. The appropriate addition time is dependent on the reactivities of the starting materials and the end-capping agent and the polymerization temperature. For example, end-capping can be described as the preparation of functionalized arylene sulfide polymers by addition to the polymerization mixture of a functionalized monohaloaromatic having enhanced halide reactivity and containing the desired functional group.

However, functionalization by typical end-capping is not a viable alternative if the desired end-capping agent is unstable or reactive in the presence of water, e.g. carboxylic acid halides. Polymerization of arylene sulfide polymers occurs in the presence of water whether that water is present initially or is water that is produced during the polymerization. Since it is well known that carboxylic acid halides hydrolyze to form carboxylic acids, to obtain arylene sulfide polymers having derivatized end-groups of the desired functionality, the derivatization of the end-groups must occur in the absence of water. Therefore, the arylene sulfide polymer derivatization of the invention cannot be accomplished by practicing a typical end-capping procedure.

While arylene sulfide polymers are useful for many applications, the ability of arylene sulfide polymers to better withstand the high temperatures encountered during melt processing is desired. Arylene sulfide polymers having improved melt stability, i.e. melt processability, would be particularly useful in areas such as injection molding and coatings.

Analysis of polymer end-groups of arylene sulfide polymers is another problem which has long existed. Arylene sulfide polymers for which end-group analyses are readily obtainable would be particularly useful in determining the behavior of the arylene sulfide polymer during subsequent processing.

SUMMARY OF THE INVENTION

It is an object of the invention to provide a process for end-group derivatization of arylene sulfide polymers which provides arylene sulfide polymers having improved melt processability and improved coatings applicability. It is a further object of the invention to provide a process for end-group derivatization of arylene sulfide polymers which enables structural analysis of polymer end-groups. It is a still further object of the invention to provide a derivatized arylene sulfide polymer composition having improved melt processability and improved coatings applicability. It is yet a further object of the invention to provide a derivatized arylene sulfide polymer composition for which end groups can be analyzed.

According to the invention, a process for end-group derivatization of arylene sulfide polymer is provided which comprises contacting an arylene sulfide polymer, a compound having the formula

wherein R' is selected from the group consisting of an alkyl radical having 1 to about 17 carbon atoms, an aryl radical having 6 to about 16 carbon atoms, and combinations thereof and X is selected from the group consisting of chlorine and bromine, and a solvent at an elevated temperature wherein the solvent is stable in the presence of said compound, i.e. the solvent does not react with said compound, and the arylene sulfide polymer is soluble in the solvent. In a further embodiment, the carbonyl carbon of said compound is enriched with carbon-13 to enable end-group analysis.

Further according to the invention, a derivatized arylene sulfide polymer composition is provided having end-groups comprising the structure

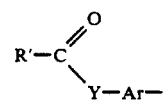

wherein Y is selected from the group consisting of —O—, —NH—, —S—, and —NR'''—, R''' is selected from the group consisting of an alkyl radical of 1 to about 4 carbon atoms, a cycloalkyl radical of 3 to about 8 carbon atoms and combinations thereof, R' is selected from the group consisting of an alkyl radical having 1 to about 17 carbon atoms, an aryl radical having 6 to about 16 carbon atoms and combinations thereof, and Ar is selected from the group consisting of

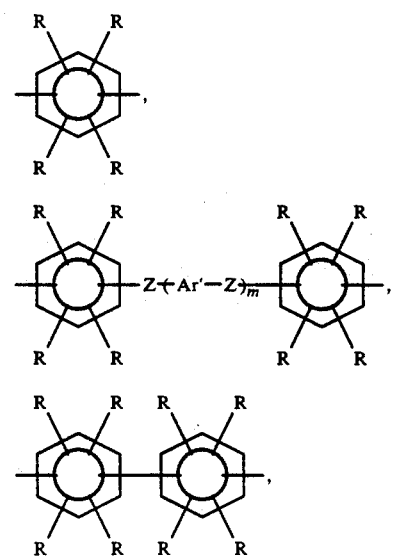

and combinations thereof wherein Ar' is a divalent radical selected from the group consisting of

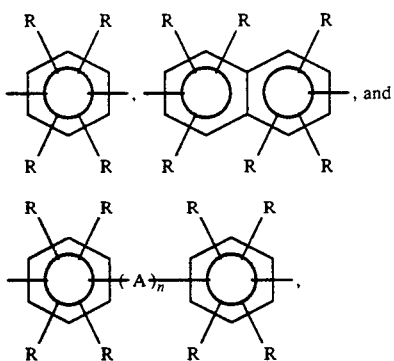

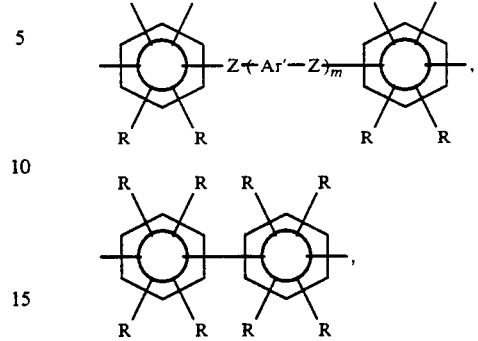

Z is selected from the group consisting of —SO₂— and —CO—, m is 0 or 1, n is 0 or 1, A is selected from the group consisting of oxygen, sulfur, sulfonyl, and $CR_2$, wherein each R is selected from the group consisting of hydrogen and alkyl radicals having 1 to about 4 carbon atoms, the total number of carbon atoms in all of the R groups in the molecule being 0 to about 12.

DETAILED DESCRIPTION OF THE INVENTION

Figure 1:
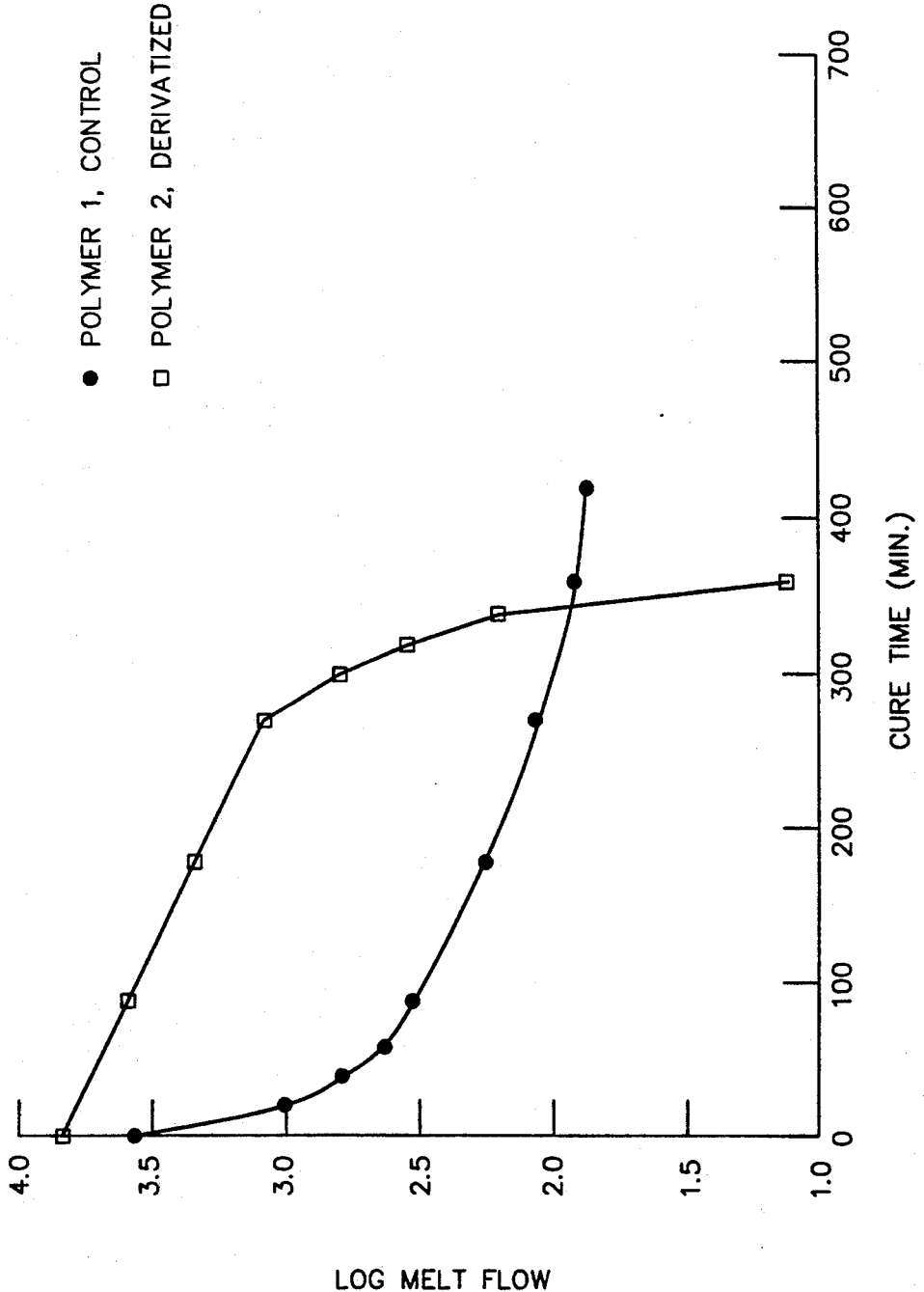
FIG. 1 is a plot demonstrating the effect of derivatization on curing behavior of a linear poly(phenylene sulfide) of low molecular weight as described in Example I.

This invention relates to a derivatized arylene sulfide polymer composition and a process for end-group derivatization of arylene sulfide polymer.

The term "arylene sulfide polymer" is defined by the formula

 wherein —Ar—S— is the repeating unit, i is the number of repeating units in the polymer molecule, and Ar is selected from the group consisting of

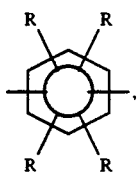

and combinations thereof wherein Ar' is a divalent radical selected from the group consisting of

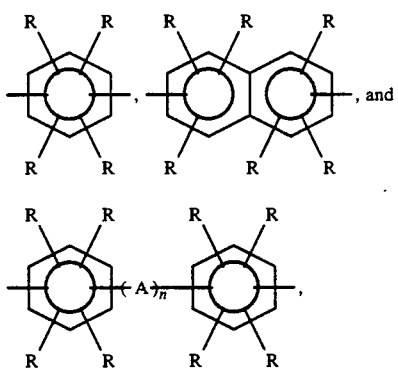

Z is selected from the group consisting of —SO₂— and —CO—, m is 0 or 1, n is 0 or 1, A is selected from the group consisting of oxygen, sulfur, sulfonyl, and $CR_2$ wherein each R is selected from the group consisting of hydrogen and alkyl radicals having 1 to about 4 carbon atoms, the total number of carbon atoms in all of the R groups in the molecule being 0 to about 12. The arylene sulfide polymer end-groups suitable for derivatization by the process of the invention are represented by the formula

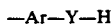

—Ar—Y—H wherein Ar is defined as above for the arylene sulfide polymer and Y is selected from the group consisting of —O—, —NH—, —S—, and —NR'''— wherein R''' is selected from the group consisting of an alkyl radical of 1 to about 4 carbon atoms, a cycloalkyl radical of 3 to about 8 carbon atoms and combinations thereof. Currently, R''' is preferably —CH₃.

The arylene sulfide polymers used in the derivatization process of the invention should be dried to ensure that the derivatization is conducted in the substantial absence of water.

Suitable arylene sulfide polymers include, but are not limited to those described in U.S. Pat. Nos. 3,354,129, 3,919,177, 4,795,799, and 4,808,698, all of which are incorporated by reference herein. Examples of arylene sulfide polymers suitable for purposes of this invention include those represented by the formulas

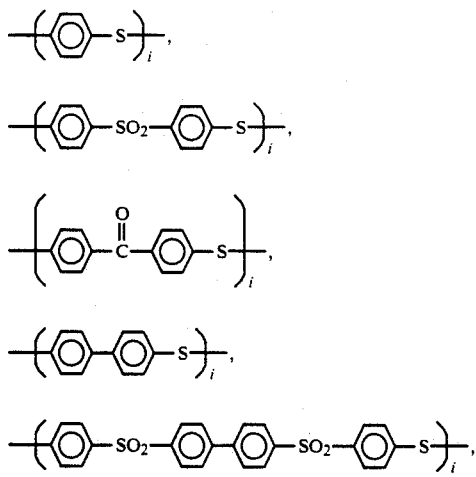

and copolymers thereof. Because of its availability and commercial applicability poly(phenylene sulfide) is the presently preferred arylene sulfide polymer.

The compounds employed in the derivatization process of the invention can be represented by the formula

wherein R' is selected from the group consisting of an alkyl radical having 1 to about 17 carbon atoms, an aryl radical having 6 to about 16 carbon atoms, and combinations thereof and X is selected from the group consisting of chlorine and bromine. Combinations thereof, as used above, may be defined as alkaryl and aralkyl radicals. The aryl radicals defined above may also contain 1 or more substituent groups including, but not limited to, —NO$_2$, —OR" wherein R" is an alkyl radical having 1 to about 4 carbon atoms, —Cl and —Br on the aromatic ring.

Examples of some compounds that can be employed in the derivatization process of the invention include acetyl chloride, acetyl bromide, propanyl chloride, propanoyl bromide, butanoyl chloride, valeroyl chloride, octanoyl chloride, stearoyl chloride, benzoyl chloride, benzoyl bromide, 4-nitrobenzoyl chloride, 3-nitrobenzoyl chloride, 3,5-dinitrobenzoyl chloride, 3-bromobenzoyl chloride, 4-bromobenzoyl chloride, 3-chlorobenzoyl chloride, 4-chlorobenzoyl chloride, 4-methoxybenzoyl chloride, 4-biphenylcarbonyl chloride, 1-naphthoyl chloride, 2-naphthoyl chloride, 4-ethoxybenzoyl chloride, m-toluoyl chloride, p-toluoyl chloride, phenylacetyl chloride, 3-phenylpropanyl chloride, and the like, and mixtures thereof. The presently preferred compound is benzoyl chloride due to its effectiveness.

The amount of compound employed in the derivatization process of the invention depends upon the amount of arylene sulfide polymer employed. The amount of compound can be expressed in terms of a molar ratio of compound to repeating unit of arylene sulfide polymer and will generally be about 0.05:1 to about 1:1 wherein the moles of repeating unit of arylene sulfide polymer is defined as the weight of arylene sulfide polymer divided by the molecular weight of a repeating unit of arylene sulfide polymer. Preferably this molar ratio is about 0.07:1 to about 0.5:1, and most preferably about 0.1:1 to about 0.35:1.

In a further embodiment of the invention, the carbonyl carbon of the compounds is enriched with carbon-13 to enable end-group analysis using high temperature NMR.

Examples of carbon-13 enriched compounds that can be employed in the derivatization process of the invention include, but are not limited to, acetyl-1-$^{13}$C-chloride, acetyl-1-$^{13}$C-bromide, benzoyl-carbonyl-$^{13}$C-chloride, and benzoyl-carbonyl-$^{13}$C-bromide. The presently preferred compound is benzoyl-carbonyl-$^{13}$C-chloride because of the excellent results obtained therewith.

The solvents used in the derivatization process of the invention are those that are stable in the presence of the derivatization compound, i.e. the solvent does not react with said compound, and which are capable of dissolving the arylene sulfide polymer, i.e. the arylene sulfide polymer is soluble in the solvent, at the elevated temperature employed in the process. Suitable solvents are selected from the group consisting of chlorinated aromatic hydrocarbons, aromatic ethers, cyclic organic amides, aromatic nitrogen containing heterocycles, and sulfones. Examples of suitable solvents include 1-chloronaphthalene, 2-chlornaphthalene, diphenylether, N-cyclohexyl-2-pyrrolidone, N-methyl-2-pyrrolidone, pyridine, quinoline, sulfolane, and the like and mixtures thereof. 1-Chloronaphthalene is especially preferred because of excellent results obtained therewith.

The amount of solvent employed according to the invention can be expressed in terms of weight percent of the arylene sulfide polymer based on the total weight of arylene sulfide polymer and solvent. Broadly, the weight percent of arylene sulfide polymer based on the total weight of arylene sulfide polymer and solvent will be in the range of about 5 to about 50, preferably about 10 to about 25.

The temperature used in the process of the invention is at least sufficient to dissolve the arylene sulfide polymer in the solvent utilized. The temperature used should also be less than the temperature at which the derivatization compound becomes unstable. The applicable temperature range for the process of the invention will be dependent on the particular arylene sulfide polymer being derivatized. For example, when the arylene sulfide polymer is poly(phenylene sulfide), the temperature range will generally be from the temperature at which the poly(phenylene sulfide) dissolves in the solvent to about 275° C., preferably from about 200° C. to about 260° C., and most preferably from about 210° C. to about 240° C.

The pressure employed in the process of the invention will depend upon the apparatus used in the process. If the temperature used is below the boiling point of the solvent and the derivatization compound, an essentially atmospheric pressure may be used or an applied pressure may be used if the apparatus is a closed system. If the temperature used is above the boiling point of either the solvent or the derivatization compound, a closed system, such as a sealed autoclave, is required and the system pressure will be the pressure generated by the vapor pressure of the system or an applied pressure of less than about 500 psig. If an applied pressure is desired, an inert gas is preferably used to pressurize the system. The inert gas comprises nitrogen, helium, neon, and argon. The current preferred inert gas is nitrogen due to its cost and availability.

The process of the invention should be conducted in an apparatus which is equipped with a means for agitating the contents of the apparatus. For example, in a commercial process the vessel utilized for the derivatization should be equipped with some type of stirring means, e.g. a mechanical mixer.

The derivatized arylene sulfide polymer composition will have end-groups comprising the structure

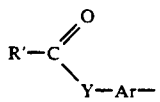

wherein Y is selected from the group consisting of —O—, —NH—, —S—, and —NR'''—, R''' is selected from the group consisting of an alkyl radical of 1 to about 4 carbon atoms, a cycloalkyl radical of 3 to about 8 carbon atoms and combinations thereof, R' is selected from the group consisting of an alkyl radical having 1 to about 17 carbon atoms, an aryl radical having 6 to about 16 carbon atoms and combinations thereof, and Ar is selected from the group consisting of

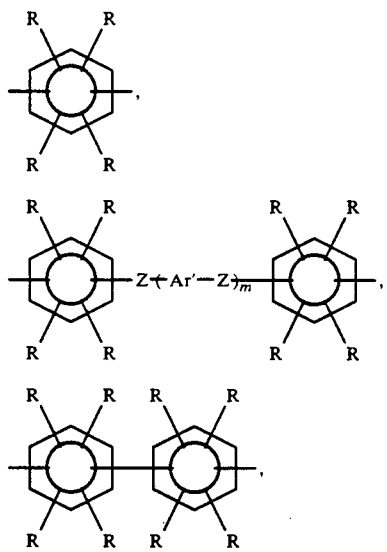

and combinations thereof wherein Ar' is a divalent radical selected from the group consisting of

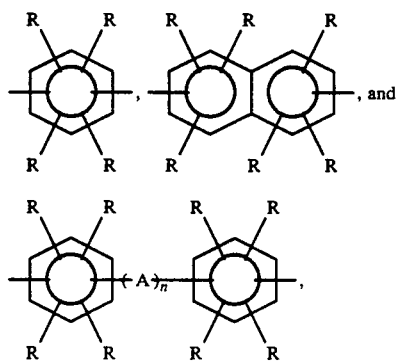

Z is selected from the group consisting of —SO$_2$— and —CO—, m is 0 or 1, n is 0 or 1, A is selected from the group consisting of oxygen, sulfur, sulfonyl, and CR$_2$, wherein each R is selected from the group consisting of hydrogen and alkyl radicals having 1 to about 4 carbon atoms, the total number of carbon atoms in all of the R groups in the molecule being 0 to about 12. If the arylene sulfide polymer employed in the process of the invention is poly(phenylene sulfide), the polymer will have end-groups comprising the structure

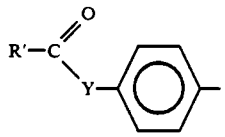

wherein Y and R' are defined above. If the derivatization compound employed is benzoyl chloride, the derivatized poly(phenylene sulfide) composition will have end-groups comprising the structure

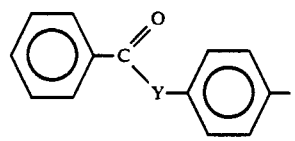

wherein Y is defined above.

The arylene sulfide polymers produced by the process of the invention can be cured to provide cured products having high thermal stability and good chemical resistance, wherein curing is defined as a distinct process step after polymer drying comprising a thermal treatment on the polymer in the presence of an oxygen-containing atmosphere during which the melt flow of the arylene sulfide polymer is reduced. The preferred oxygen-containing atmosphere is air. The arylene sulfide polymers produced by the process of the invention have a distinct cure profile, i.e. the derivatized arylene sulfide polymers have an induction period during which no significant amount of curing occurs as indicated by the change in melt flow of the polymer. Following this induction period, the polymer cures rapidly.

Melt flow is a measurement of melt viscosity which is particularly useful in characterizing arylene sulfide polymers. It is generally considered that melt flow is inversely related to molecular weight for polymeric materials in general and for arylene sulfide polymers in particular. As used herein the term "melt flow" refers to polymer flow rates in grams per 10 minutes measured according to ASTM D 1238-86 using condition 316/5.0 modified to use a 5 minute preheat time.

The induction period during curing of the derivatized arylene sulfide polymers should provide arylene sulfide polymers having improved melt stability during melt processing, such as injection molding or extrusion, and improved coatings applicability. Improvement in the application of arylene sulfide polymers as a coating should result because the induction period would permit molten polymer to flow uniformly over the substrate without significant curing occurring. The uniformly distributed coating could then be cured rapidly to produce an improved product.

EXAMPLES

In the following examples, poly(phenylene sulfide) (PPS) melt flow (MF) values were determined by the method of ASTM D-1238, Procedure B-Automatically Timed Flow Rate Procedure, Condition 316/5.0, with a preheat time of 5 minutes and are expressed as g/10 minutes. Sample curing was done by placing about 7 grams of the PPS in each of several small aluminum pans and heating the pans in a Fisher Isotemp oven at 265° C. for varying lengths of time. The logarithms of the melt flow values determined on the cured samples were plotted against the curing time in minutes.

All glassware for the reactions was oven-dried at 150° C. prior to use. The Ryton ® poly(phenylene sulfide) samples were commercial polymers from Phillips 66 Company with a PR10 or PR11 designation. PR10 is an uncured polymer with a MF of about 150-250 g/10 min. and PR11 is an uncured polymer with a MF of about 3000 g/10 min. 1-Chloronaphthalene, Aldrich Chemical Company, was dried by distillation from calcium hydride immediately before use. Benzoyl chloride was used as received from Aldrich.

A high temperature/high resolution (HT/HR) carbon-13 NMR probe was designed and built for a JEOL JNM-GX270 FT-NMR Spectrometer. The variable temperature (VT) system for this probe consists of a standard external VT probe heater to preheat nitrogen to about 100° C. before it enters the probe and a ceramic cartridge heater in the HT/HR probe to heat the nitrogen to its final temperature. A temperature control system consisted of a MIC 2000 controller for the cartridge heater and a variable AC transformer for manual adjustment of the external heater voltage.

The NMR spectra were obtained at 270° C. using 30 weight percent PPS with N-cyclohexyl-2-pyrrolidone, Aldrich, as solvent. Air was carefully removed from the NMR tubes to avoid any curing of the polymer during the spectral analysis. Chemical shifts were determined using hexadeutero-tetraglyme at 71.0 ppm as a reference. The primary reference was tetramethylsilane (TMS) at 0.0 ppm.

Polymer melt viscosities were determined on a Rheometric Dynamic Spectrometer (Rheometrics, Inc.) wherein the molten polymer is contained between two 2.54 cm diameter stainless steel plates. The upper plate oscillates horizontally at varying frequencies while the lower plate is connected to a sensing device. Test conditions were 315° C. under nitrogen. The polymer melt viscosity in poise was determined as a function of oscillation frequency in radians per second.

EXAMPLE I

In an invention run, a PPS sample was derivatized with benzoyl chloride. To a one-liter, three-necked round bottomed flask was charged 100 g of Ryton ® PR11 PPS (Polymer 1), 400 g of 1-chloronaphthalene, and 40 g of benzoyl chloride. The flask was then fitted with a 38.1 mm egg-shaped stirring bar, thermocouple adapter, reflux condenser, and nitrogen inlet adaptor. Nitrogen was bubbled into the stirred suspension for 30 minutes. After the nitrogen flow was slowed, the reaction mixture was heated to 230° C. and held for three hours. After the reaction mixture had cooled, the solidified mass was ground in a blender jar with 400 mL of isopropanol. The product (Polymer 2) was then washed twice with hot isopropanol (80° C., 400 mL) and twice with hot water (80° C., 800 mL). Polymer 2 was dried to a constant mass in a vacuum oven at 125° C. Product yields on repeated runs ranged from 95-98 percent. The derivatized Polymer 2 had weak Fourier Transform Infrared (FTIR) peaks at 1740 and 1700 cm$-1$, whereas the starting Polymer 1 did not.

Samples of Polymers 1 and 2 were cured for various lengths of time and the results are shown in FIG. 1. The cure curves for Polymers 1 and 2 are quite different. Polymer 1 decreases in MF rapidly with increased cure time and then tends to cure slower after about 150 minutes. Polymer 2 decreases in MF slowly until about 240 minutes and then decreases rapidly in MF.

Figure 2:
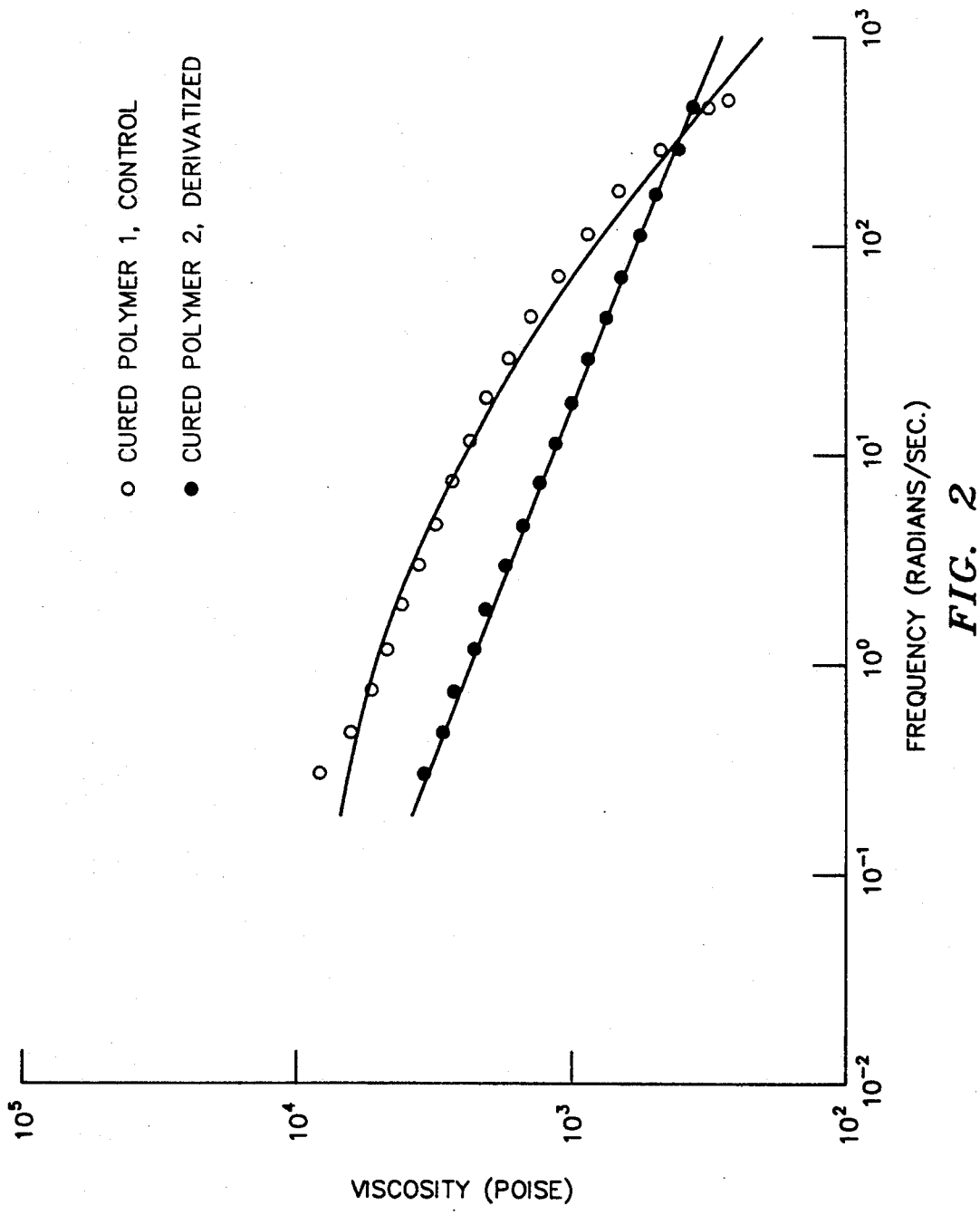
FIG. 2 is a plot demonstrating the effect of derivatization on melt viscosity profiles of the cured poly(phenylene sulfide) of FIG. 1 as described in Example I.

Melt viscosity profiles of one cured sample (MF=59 g/10 min.) of Polymer 1 and of cured sample (MF=52 g/10 min.) of Polymer 2 (FIG. 2) indicate a different response to changing shear rates. This shows that the two cured samples, although having similar melt viscosities, have different structures.

The IR spectra also suggest that the two cured polymers are different. Cured control Polymer 1 has a peak at 640 cm$-1$ which increases in intensity with increased cure times. Cured Polymer 2 does not show this peak, indicating that the curing processes are different for Polymers 1 and 2.

EXAMPLE II

Figure 3:
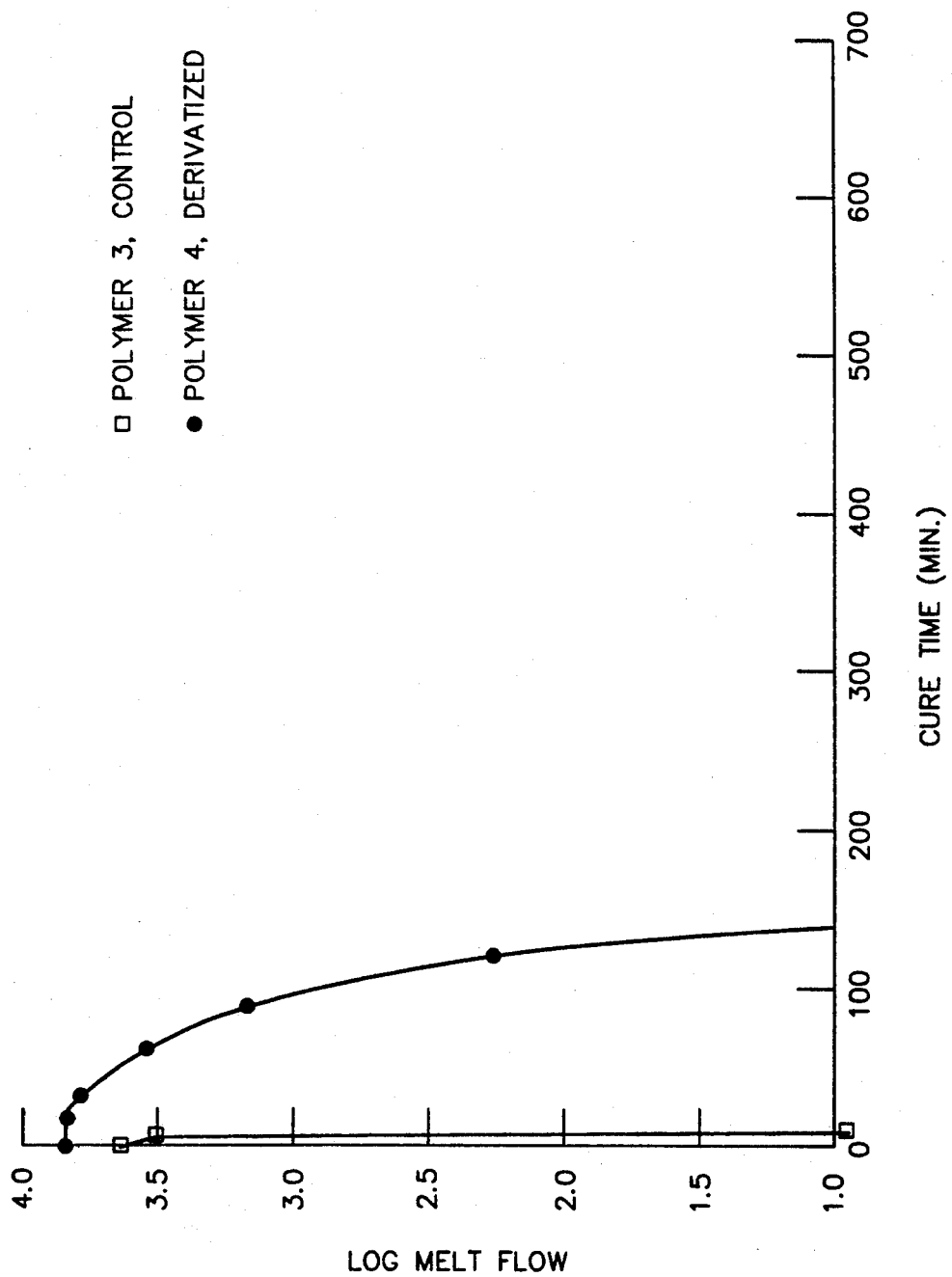
FIG. 3 is a plot demonstrating the effect of derivatization on curing behavior of a fast-curing poly(phenylene sulfide) as described in Examples II and III.

A control polymer and starting material for Example III was polymerized using excess sodium hydroxide relative to the amount of sodium hydrosulfide to produce a PPS with an enhanced curing behavior compared with other PPS samples. A one-liter, stainless steel autoclave was charged with 94.94 g of 59.049 weight percent sodium hydrosulfide solution (1.00 g-mol), 44.00 g (1.10 g-mol) of sodium hydroxide, and 248 g (2.50 g-mol) of N-methyl-2-pyrrolidone (NMP). The autoclave was then flushed with nitrogen and heated to 150° C. where a dehydration was started under a slow nitrogen purge and a moderate increase in temperature. The dehydration was halted at 207° C. at which point the autoclave was charged with a solution of 148.5 g (1.01 g-mol) of p-dichlorobenzene (DCB) and 74.3 g (0.75 g-mol) of NMP using a nitrogen purged charge vessel and followed with an NMP rinse (24.8 g, 0.25 g-mol) of the charge vessel. The reactor contents were heated to 235° C. and held for one hour, heated to 265° C. and held for two hours, and then cooled to room temperature. The solidified mass was ground in a blender jar with 400 mL of isopropanol, filtered, and washed successively with hot water (80° C., one liter) until the wash filtrate was colorless. After the solid was dried in a vacuum oven at 125° C., Polymer 3 was obtained in a yield of 92 percent. Several samples of Polymer 3 were cured at various times and the MF of the cured samples were plotted in FIG. 3 against the curing time.

EXAMPLE III

In this example, Polymer 3 was reacted with benzoyl chloride to produce derivatized invention Polymer 4. A reaction was carried out as described in Example I using 50.0 g of Polymer 3, 200 g of 1-chloronaphthalene, 20.0 g of benzoyl chloride. The product was recovered, washed, and dried as described in Example I to yield Polymer 4. The MF of cured samples of Polymer 4 were determined and plotted in FIG. 3 for comparison with Polymer 3. The results show that Polymer 3, as expected from the polymerization with excess sodium hydroxide, cured very rapidly while Polymer 4 cured slower. The different curing behavior indicates that the derivatization has changed the PPS significantly. Furthermore, derivatization of a fast curing polymer results in a polymer having a curing behavior that is easier to control (Polymer 4 v. Polymer 3).

EXAMPLE IV

Several model compounds were prepared for carbon-13 NMR studies for comparison with Polymer 5 in Example V. Phenyl benzoate, benzanilide, N-methylbenzanilide, and thiophenyl benzoate were prepared from benzoyl chloride and phenol, aniline, N-methylaniline, and thiophenol, respectively.

Using benzanilide as an example of the model compound preparation, 4.00 g of sodium hydroxide in 150 mL of water was placed in a blender. 150 g of ice and 9.31 g of aniline were added and the blender was started at slow speed. 14.76 g of benzoyl chloride in 150 mL of chloroform was added over 30 seconds. The mixture was stirred at high speed for 5 minutes and the solid was filtered. The solid was washed with 250 mL of water and 250 mL of acetone and then dried to yield benzanilide. All products were white, crystalline solids, except for N-methylbenzanilide, which was a clear, light yellow liquid.

Carbon-13 NMR carbonyl chemical shifts of the model compounds in N-cyclohexyl-2-pyrrolidone are shown in Table I. The model compound carbonyl peaks represent peak expected for derivatized PPS end-groups such as hydroxyl, amine, N-methylamine, and thiol. The carbonyl peaks of benzoic acid, the hydrolysis product from the starting benzoyl chloride, and benzoyl chloride are included in Table I.

TABLE I

Carbonyl C-13 NMR Chemical Shifts In Model Compounds[a]

| Model Compound | Carbonyl Signal Chemical Shift, ppm |
|---|---|
| Phenyl Benzoate | 164.3 |
| Benzanilide | 164.9 |
| N-Methylbenzanilide | 169.1 |
| Thiophenyl Benzoate | 188.3 |
| Benzoic Acid (270° C.) | 166.3 |
| Benzoyl Chloride | 167.4 |

[a]Spectra obtained using N-cyclohexyl-2-pyrrolidone as solvent at 50° C., except as noted.

EXAMPLE V

A carbon-13 enriched, derivatized PPS was prepared for NMR analysis to determine which PPS end-groups react with the benzoyl chloride during derivatization. The reaction was carried out in a manner similar to that described in Example I except for a smaller scale and a lower level of benzoyl chloride. The quantities used were 5.0 g of Polymer 1, 20.0 g of 1-chloronaphthalene, and 1.0 g of carbon-13 (99 percent carbonyl enriched) benzoyl chloride. After the usual washing and drying, 4.57 g (91 percent yield) of Polymer 5 was isolated.

Figure 4:
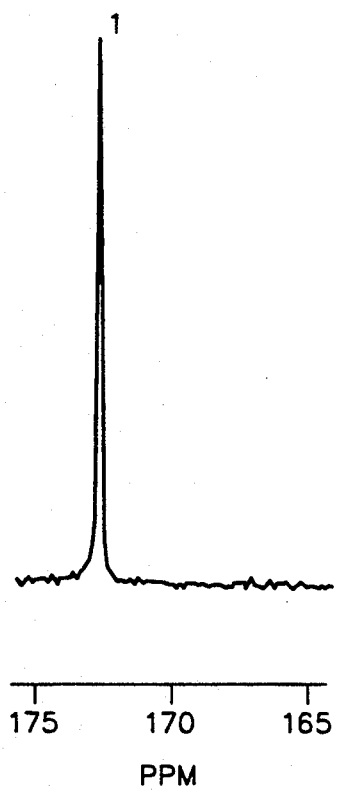
FIGS. 4 and 5, respectively, are the carbon-13 NMR spectra showing end-group analysis for derivatized poly(phenylene sulfide) and derivatized poly(phenylene sulfide) having the carbonyl carbon of the derivatization compound enriched with carbon-13 as described in Example V.
Figure 5:
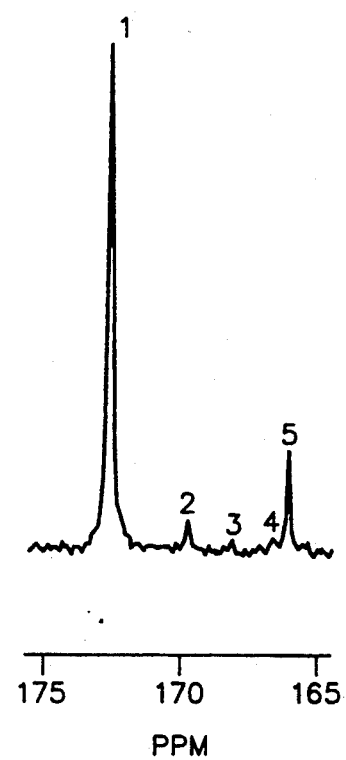

The carbon-13 NMR spectrum of invention Polymer 2 FIG. 4 shows no carbonyl peaks other than the solvent peak 1 at 172.4 ppm because the concentration of polymer end groups is below the detection limits of the NMR system with the natural abundance of carbon-13. With the enriched level of carbon-13 in Polymer 5, several peaks appear in the carbonyl region (165-175 ppm) of the NMR spectrum of Polymer 5 (FIG. 5).

A comparison of the values of the carbonyl chemical shifts of Polymer 5 with those of the model compounds in Table I indicates that peak 4 at 166.3 ppm is from benzoic acid and that peak 3 at 167.9 ppm is from benzoyl chloride. The 165.9 ppm peak 5 corresponds with either the phenyl benzoate peak at 164.3 ppm or benzanilide at 164.9 ppm, indicating that this is from reaction of benzoyl chloride with hydroxyl or amine end-groups. The FTIR carbonyl peak of Polymer 2 at 1740 cm−1 suggests that the ester group is more likely and that the original end-group is probably the hydroxyl. Peak 2 at 169.5 ppm corresponds to the N-methylbenzamide peak at 169.1 ppm. Exact matches of the polymer end-group carbonyl peaks with model compound carbonyl peaks would not be expected because of temperature differences and the absence of a para sulfur substituent effect in the model compounds. No evidence was observed for the presence of derivatized end-groups from the thiol group but this does not exclude the existence of thiol end-groups since they would be expected to occur at very low levels. For example, thiol end-groups have been detected during the characterization of arylene sulfide oligomers that have been separated from the polymer.

From an integration of the NMR signals, the end-groups in the starting PPS Polymer 1 were about 4.9% N-methylamino, about 20.6% amine or hydroxyl, and about 74.5% chloro.

EXAMPLE VI

A control run was carried out to demonstrate that benzoic acid added to the PPS polymerization reaction does not accomplish the derivatization reaction of the present invention. Control Polymer 6 was prepared by charging 94.94 g (1.0 g-mol) of sodium hydrosulfide (as a 59.049 weight percent aqueous solution), 40.0 g (1.0 g-mol) of sodium hydroxide, and 247.8 g (2.5 g-mol) of NMP to a one liter stainless steel autoclave. The autoclave was flushed with nitrogen and heated to 150° C. where a dehydration was started under a slow nitrogen purge and a moderate increase in temperature. The dehydration was halted at 207° C. at which point the autoclave was charged with a solution of 147.5 g (1.01 g-mol) of DCB in 75.0 g (0.75 g-mol) of NMP using a nitrogen purged charge vessel and followed with an NMP rinse (24.1 g) of the charge vessel. The autoclave contents were heated to 235° C. and held for one hour, heated to 265° C. for two hours, and then 8.7 g (0.071 g-mol) of benzoic acid and 0.25 g-mol of NMP charged. The autoclave contents were heated at 265° C. for one hour and then cooled to room temperature. The autoclave contents were recovered and purified as described in Example II to produce Polymer 6. The curing pattern of Polymer 6 was similar to the pattern of Polymer 1, indicating that no significant amount of derivatization had occurred. This indicates that the arylene sulfide polymer derivatization of the invention cannot be accomplished by practicing a typical end-capping procedure.

EXAMPLE VII

Figure 6:
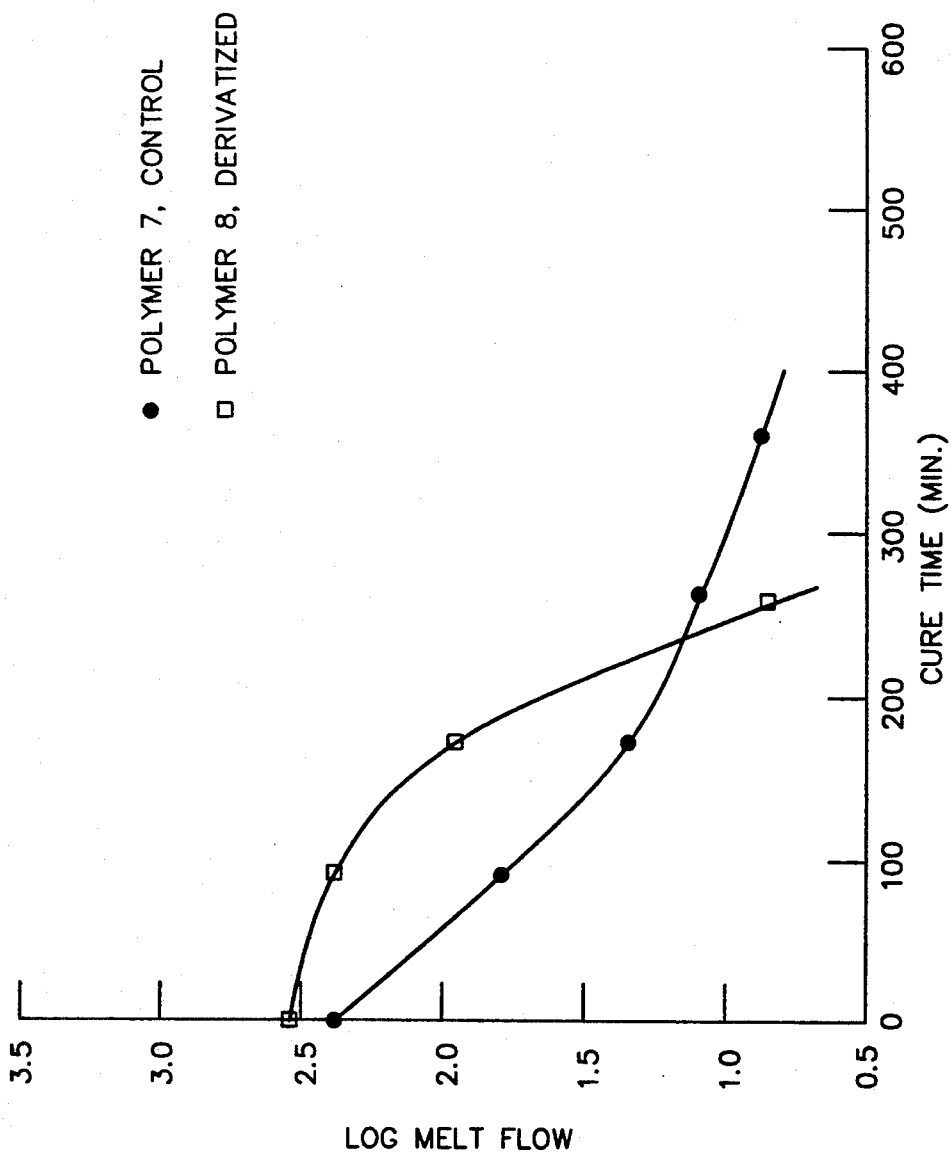
FIG. 6 is a plot demonstrating the effect of derivatization on curing behavior of a linear poly(phenylene sulfide) of high molecular weight as described in Example VII.

Another invention polymer was prepared using Ryton ® PR10 PPS and benzoyl chloride. A sample of PR10 (Polymer 7) was dried at 110° C. in a vacuum oven for two days. A reaction was carried out as described in Example I using 100 g of the dried PR10, 400 g of 1-chloronaphthalene, and 25.0 g of benzoyl chloride. The recovered and dried derivatized Polymer 8 was cured along with control Polymer 7. A plot of the results (FIG. 6) shows that there is a difference in the cure profiles. Polymer 7 cures faster initially, while Polymer 8 cures slowly at first and faster later. As in earlier examples, the derivatization changes the PPS curing behavior.

That which is claimed is:

1. A derivatized arylene sulfide polymer composition having end-groups comprising the structure

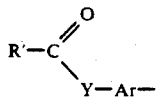

wherein Y is selected from the group consisting of —O—, —NH—, —S—, and —NR'''—, R''' is selected from the group cosisting of an alkyl radical of 1 to about 4 carbon atoms, a cycloalkyl radical of 3 to about 8 carbon atoms and combinations thereof, R' is selected from the group consisting of an alkyl radical having 1 to about 17 carbon atoms, an aryl radical having 6 to about 16 carbon atoms and combinations thereof, and Ar is selected from the group consisting of

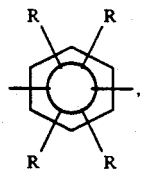

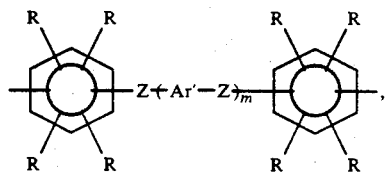

and combinations thereof wherein Ar' is a divalent radical selected from the group consisting of

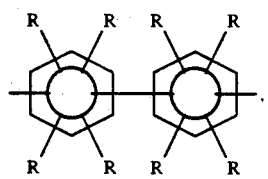, and

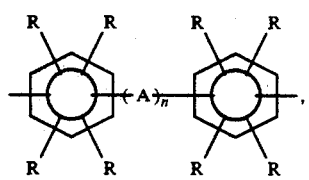

Z is selected from the group consisting of —SO$_2$— and —CO—, m is 0 or 1, n is 0 or 1, A is selected from the group consisting of oxygen, sulfur, sulfonyl, and CR$_2$, wherein each R is selected from the group consisting of hydrogen and alkyl radicals having 1 to about 4 carbon atoms, the total number of carbon atoms in all of the R groups in the molecule being 1 to about 12, wherein said arylene sulfide polymer is represented by a formula selected from the group consisting of

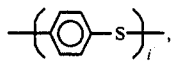

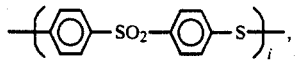

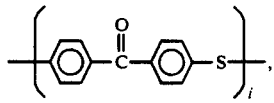

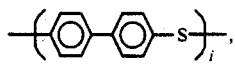

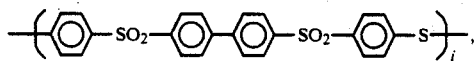

and copolymers thereof.

2. A derivatized arylene sulfide polymer composition according to claim 1 wherein said arylene sulfide polymer is poly(phenylene sulfide) having end groups comprising the structure

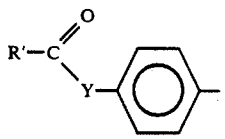

wherein Y is selected from the group consisting of —O—, —NH—, —S—, and —NR'''—, R''' is selected from the group consisting of an alkyl radical of 1 to about 4 carbon atoms, a cycloalkyl radical of 3 to about 8 carbon atoms and combinations thereof, and R' is selected from the group consisting of an alkyl radical having 1 to about 17 carbon atoms, an aryl radical having 6 to about 16 carbon atoms and combinations thereof.

3. A derivatized arylene sulfide polymer composition according to claim 2 wherein said R' is

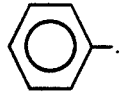

4. A derivatized arylene sulfide polymer composition according to claim 2 wherein said R''' is —CH$_3$.

5. A derivatized arylene sulfide polymer composition having end-groups comprising the structure

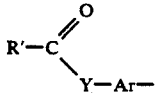

wherein Y is selected from the group consisting of —O—, —NH—, —S—, and —NR'''—; R''' is selected from the group consisting of an alkyl radical of 1 to about 4 carbon atoms, a cycloalkyl radical of 3 to about 8 carbon atoms and combinations thereof, R' is selected from the group consisting of an alkyl radical having 1 to about 17 carbon atoms, an aryl radical having 6 to about 16 carbon atoms and combinations thereof, and Ar is selected from the group consisting of

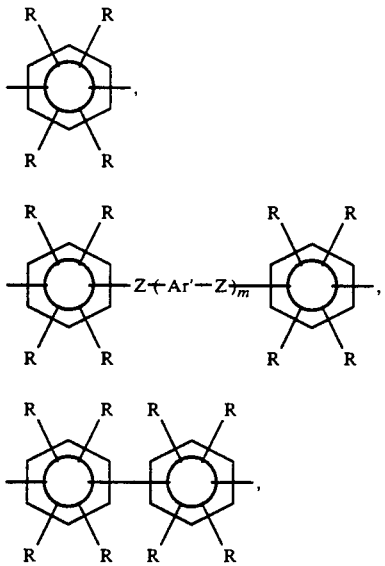

and combinations thereof wherein Ar' is a divalent radical selected from the group consisting of

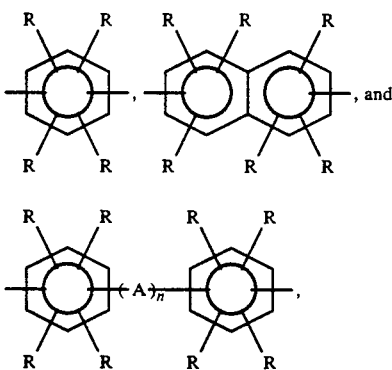

Z is selected from the group consisting of —SO$_2$— and —CO—, m is 0 or 1, n is 0 or 1, A is selected from the group consisting of oxygen, sulfur, sulfonyl, and CR$_2$, wherein each R is selected from the group consisting of hydrogen and alkyl radicals having 1 to about 4 carbon atoms, the total number of carbon atoms in all of the R groups in the molecule being 0 to about 12; wherein said derivatized arylene sulfide polymer composition is produced by a process comprising contacting:

(a) an arylene sulfide polymer characterized by the repeating unit —AR—S— wherein Ar is as defined above, (b) a compound having the formula

wherein R' is defined above and X is selected from the group consisting of chlorine and bromine, and (c) a solvent wherein said solvent is stable in the presence of said compound and said arylene sulfide polymer is soluble in said solvent, wherein said contacting is performed at an elevated temperature.

6. A derivatized arylene sulfide polymer composition according to claim 5 wherein said elevated temperature is at least sufficient to dissolve said arylene sulfide polymer and is less than the temperature at which said compound becomes unstable.

7. A derivatized arylene sulfide polymer composition according to claim 6 wherein the molar ratio of said compound to repeating unit of said arylene sulfide polymer is about 0.05:1 to about 1:1, and the weight percent of said arylene sulfide polymer based on the total weight of said arylene sulfide polymer and said solvent is in the range of about 5 to about 50.

8. A derivatized arylene sulfide polymer composition according to claim 7 wherein the molar ratio of said compound to repeating unit of said arylene sulfide polymer is about 0.1:1 to about 0.35:1 and the weight percent of said arylene sulfide polymer based on the total weight of said arylene sulfide polymer and said solvent is in the range of about 10 to about 25.

9. A derivatized arylene sulfide polymer composition according to claim 5 wherein said solvent is selected from the group consisting of chlorinated aromatic hydrocarbons, aromatic ethers, cyclic orgnic amides, aromatic nitrogen containing heterocycles, and sulfones.

10. A derivatized arylene sulfide polymer composition according to claim 9 wherein said contacting is carried out in an inert atmosphere.

11. A derivatized arylene sulfide polymer composition according to claim 10 wherein the carbonyl carbon of said compound is enriched with carbon-13.

12. A derivatized arylene sulfide polymer composition according to claim 10 wherein said compound is benzoyl chloride.

13. A derivatized arylene sulfide polymer composition according to claim 11 wherein said compound is benzoyl-carbonyl-$^{13}$C-chloride.

* * * * *